United States Patent
Sato et al.

(10) Patent No.: US 10,564,635 B2
(45) Date of Patent: Feb. 18, 2020

(54) HUMAN-COOPERATIVE ROBOT SYSTEM

(71) Applicant: FANUC CORPORATION, Yamanashi (JP)

(72) Inventors: Takashi Sato, Yamanashi (JP); Yihua Gu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 158 days.

(21) Appl. No.: 15/472,502

(22) Filed: Mar. 29, 2017

(65) Prior Publication Data
US 2017/0285625 A1  Oct. 5, 2017

(30) Foreign Application Priority Data
Mar. 30, 2016 (JP) .................. 2016-069666

(51) Int. Cl.
*G05B 15/00* (2006.01)
*G05B 19/00* (2006.01)
*G05B 19/423* (2006.01)
*B25J 9/00* (2006.01)

(52) U.S. Cl.
CPC .......... *G05B 19/423* (2013.01); *B25J 9/0081* (2013.01); *G05B 2219/39325* (2013.01)

(58) Field of Classification Search
CPC ...... B25J 13/085; B25J 9/0081; B25J 9/1633; G05B 19/423; G05B 2219/37405; G05B 2219/37544; G05B 2219/39325; G05B 2219/40586
See application file for complete search history.

(56) References Cited

U.S. PATENT DOCUMENTS

| | | | |
|---|---|---|---|
| 6,212,443 B1 * | 4/2001 | Nagata | G05B 19/423 700/245 |
| 6,385,508 B1 * | 5/2002 | McGee | B25J 9/0081 285/189 |
| 6,430,473 B1 | 8/2002 | Lee et al. | |
| 8,396,594 B2 | 3/2013 | Okazaki | |
| 2005/0166413 A1 * | 8/2005 | Crampton | B25J 13/088 33/503 |
| 2006/0048364 A1 * | 3/2006 | Zhang | B23Q 17/0966 29/407.08 |
| 2009/0000136 A1 * | 1/2009 | Crampton | B25J 13/088 33/503 |

(Continued)

FOREIGN PATENT DOCUMENTS

CN  101801616 A  8/2010
CN  104972473 A  10/2015

(Continued)

*Primary Examiner* — Harry Y Oh
(74) *Attorney, Agent, or Firm* — Hauptman Ham, LLP

(57) ABSTRACT

A robot system capable of reliably detecting contact between a robot or a workpiece and an external object. The robot system includes: a robot including a handling part; a handling force-detection part that detects a handling force applied to the handling part; an operation controller that causes the robot to operate in accordance with the handling force; an external force-detection part that detects an external force acting on the robot; and a contact force-calculation part that calculates a contact force by subtracting the handling force from the detected external force.

7 Claims, 13 Drawing Sheets

(56) References Cited

U.S. PATENT DOCUMENTS

| | | | |
|---|---|---|---|
| 2009/0105880 A1* | 4/2009 | Okazaki | B25J 9/1633 |
| | | | 700/258 |
| 2010/0152896 A1 | 6/2010 | Komatsu et al. | |
| 2015/0081099 A1 | 3/2015 | Komatsu et al. | |
| 2015/0290809 A1* | 10/2015 | Nakagawa | B25J 9/1676 |
| | | | 700/258 |
| 2015/0323398 A1* | 11/2015 | Lauzier | B25J 9/0081 |
| | | | 73/862.08 |
| 2016/0059407 A1 | 3/2016 | Sonoda | |
| 2016/0202134 A1* | 7/2016 | Malackowski | G01L 5/226 |
| | | | 73/862.05 |
| 2016/0346935 A1* | 12/2016 | Nakayama | B25J 13/085 |

FOREIGN PATENT DOCUMENTS

| | | |
|---|---|---|
| CN | 105313111 A | 2/2016 |
| JP | 5-158514 A | 6/1993 |
| JP | 2006-21287 A | 1/2006 |
| JP | 2009-66696 A | 4/2009 |
| JP | 2015-199174 A | 11/2015 |
| JP | 2016-7645 A | 1/2016 |

\* cited by examiner

HUMAN-COOPERATIVE ROBOT SYSTEM

RELATED APPLICATIONS

The present application claims priority to Japanese Patent Application No. 2016-069666 filed Mar. 30, 2016, the disclosures of which is hereby incorporated by reference herein in its entirety.

BACKGROUND OF THE INVENTION

1. Field of the Invention

The invention relates to a human-cooperative robot system that performs a task in cooperation with an operator.

2. Description of the Related Art

There has conventionally been known a human-cooperative robot system that detects a handling force applied to a robot by an operator and is operated in response to the handling force (e.g., Japanese Unexamined Patent Publication (Kokai) No. 2015-199174).

In such a human-cooperative robot system as described above, when the operator operates the robot by applying a handling force thereto, there is a possibility that the robot or a workpiece transported by the robot unintentionally contacts with an external object. Conventionally, there is a need for a technique that makes it possible to reliably detect the contact of the robot or the workpiece with the external object.

SUMMARY OF THE INVENTION

In an aspect of the invention, a human-cooperative robot system configured to work in cooperation with an operator, comprises a robot including a handling part, a handling force-detection part configured to detect a handling force applied to the handling part, and an operation controller configured to operates the robot in accordance with the handling force detected by the handling force-detection part.

Further, the robot system comprises an external force-detection part configured to detect an external force applied to the robot when the operation controller operates the robot, wherein the external force is a sum of the handling force and a contact force applied from an external object to the robot when the robot contacts the object.

Further, the robot system comprises a contact force-calculation part configured to calculate a contact force by subtracting the handling force detected by the handling force-detection part from the external force detected by the external force-detection part. The contact force-calculation part may carry out filtering to remove a noise component from the handling force detected by the handling force-detection part or the external force detected by the external force-detection part.

The operation controller may stop an operation of the robot when the contact force calculated by the contact force-calculation part exceeds a predetermined threshold value. The operation controller may change an operating speed of the robot in response to the contact force calculated by the contact force-calculation part.

The operation controller may operate the robot in accordance with the handling force only when the direction of the handling force detected by the handling force-detection part after the operation of the robot is stopped is a direction in which the contact force can be reduced.

BRIEF DESCRIPTION OF THE DRAWINGS

The above-mentioned or other objects, features and advantages of the invention will be clarified from the description of embodiments with reference to the accompanying drawings, in which.

DETAILED DESCRIPTION

Figure 1:
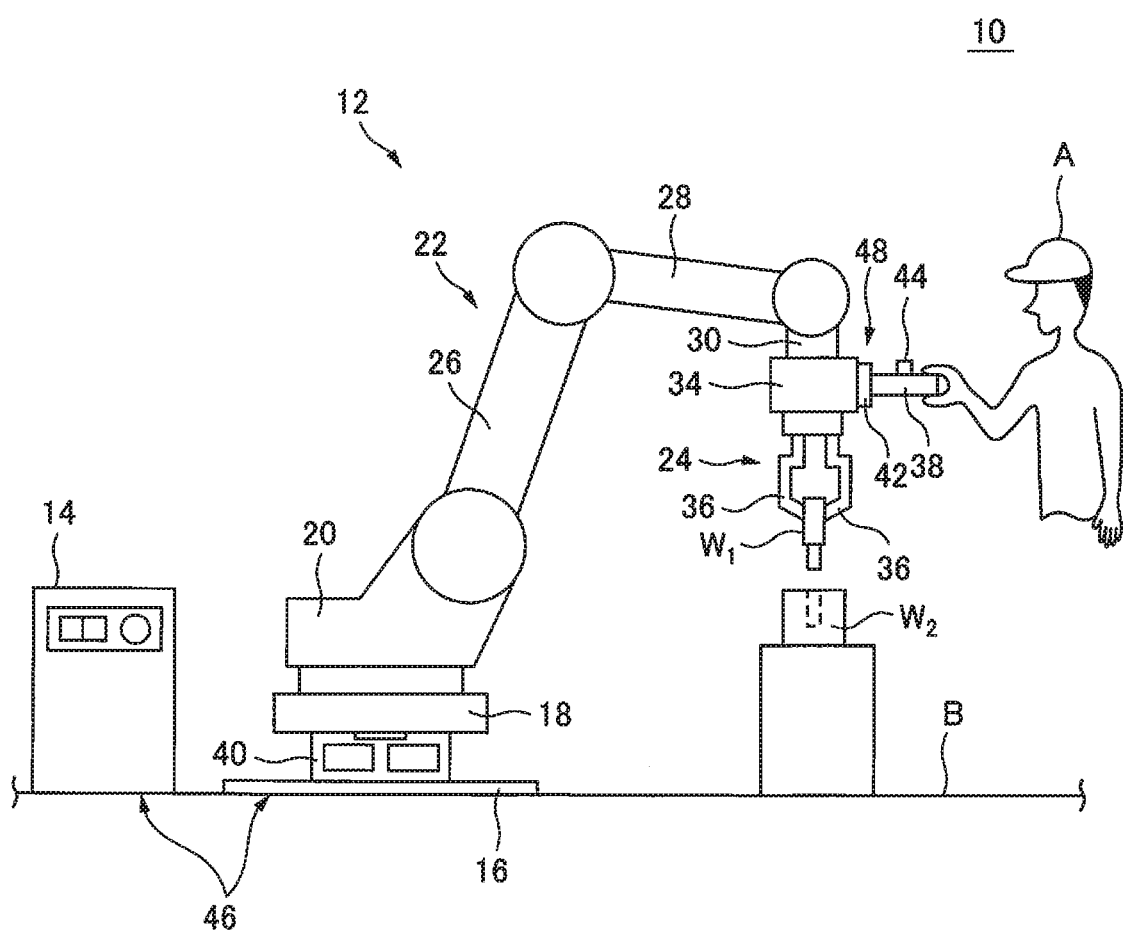
FIG. 1 is a schematic view of a robot system according to an embodiment.

Hereinafter, embodiments of the invention will be described in detail based on the drawings. First, a robot system 10 according to an embodiment of the invention will be described with reference to FIGS. 1 and 2. The robot system 10 is for fitting a workpiece $W_1$ into a workpiece $W_2$ in cooperation with an operator A.

The robot system 10 includes a robot 12 and a robot controller 14 configured to control the robot 12. The robot controller 14 includes a CPU (Central Processing Unit) and a storage (both not shown), and controls each component of the robot 12 directly or indirectly.

The robot 12 is a vertical articulated robot, and includes a robot base 18, a revolving drum 20, a robot arm 22, a robot hand 24, and a handling part 38. The robot base 18 is installed so as to be immovable with respect to a fixing plate 16 fixed on a floor B of a work cell.

The revolving drum 20 is mounted on the robot base 18 so as to be rotatable about a vertical axis. The robot arm 22 includes an upper arm 26 rotatably attached to the revolving drum 20 and a forearm 28 rotatably attached to a distal end of the upper arm 26.

The robot hand 24 is attached to a distal end of the forearm 28 via a wrist 30. The robot hand 24 includes an adapter 34 and a plurality of fingers 36 provided at the adapter 34 so as to open and close. The robot hand 24 is capable of gripping and releasing the workpiece $W_1$ by opening and closing the fingers 36.

The handling part 38 is a handle having a shape easy to grip for the operator A, and fixed to the adapter 34. A switch 44 is provided at the handling part 38. The switch 44 is electrically connected to the robot controller 14, and transmits a hand-guide ON signal to the robot controller 14 when the switch 44 is turned ON by the operator A.

Figure 2:
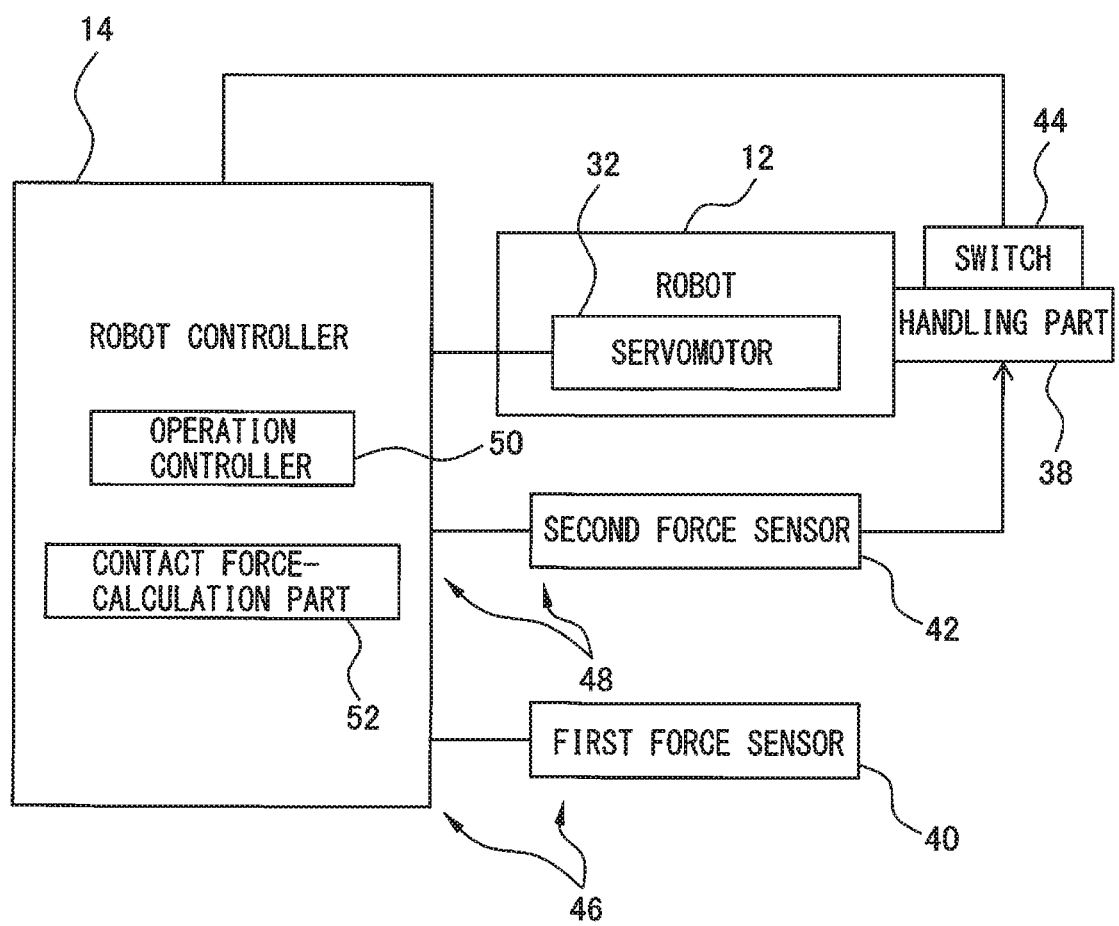
FIG. 2 is a block diagram of the robot system shown in FIG. 1.

The robot 12 includes a plurality of servo motors 32 (FIG. 2). The servo motors 32 are respectively built in the revolving drum 20, the robot arm 22, and the wrist 30, and rotate these components about axes of rotation in accordance with commands from the robot controller 14.

The robot system 10 further includes a first force sensor 40 and a second force sensor 42. The first force sensor 40 is interposed between the fixing plate 16 and the robot base 18. The first force sensor 40 is composed of a 6-axis force sensor including a plurality of strain gauges, and transmits to the robot controller 14 an output signal corresponding to a strain generated at the first force sensor 40.

The robot controller 14 filters the output signal received from the first force sensor 40 so as to remove a noise component from the output signal. For example, the robot controller 14 carries out a known signal processing, such as low-pass filtering, arithmetic averaging, weighted averaging, FIR filtering, or IIR filtering, on the output signal from the first force sensor 40, so as to remove a noise component from the output signal.

Figure 3:
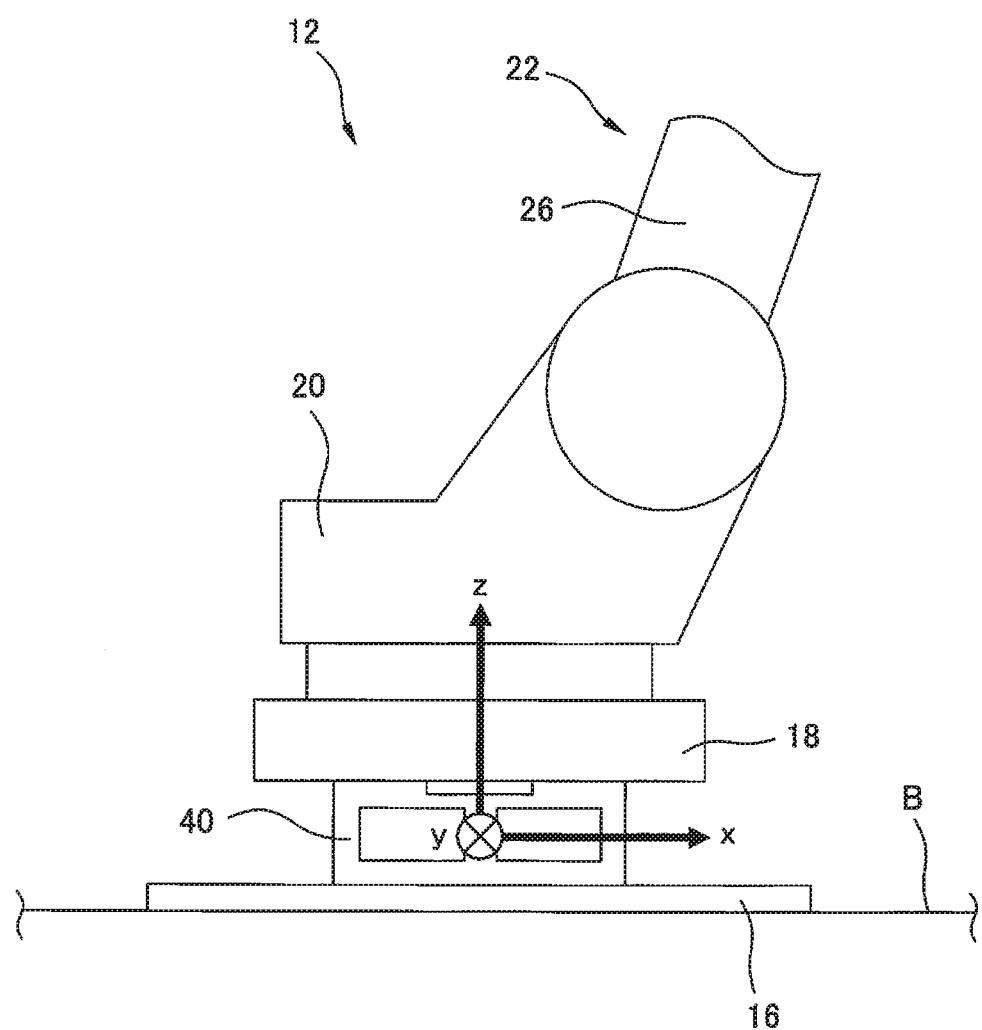
FIG. 3 is an enlarged view of the first force sensor shown in FIG. 1.

The robot controller 14 sets a first sensor-coordinate system for the first force sensor 40 as indicated by a Cartesian coordinate system in FIG. 3, for example. The robot controller 14 respectively calculates forces in the x-axis direction, y-axis direction, and z-axis direction of the first sensor-coordinate system shown in FIG. 3, and moments about the x-axis direction, y-axis direction, and z-axis direction of the first sensor-coordinate system, on the basis of the output signal from the first force sensor 40. In this manner, the robot controller 14 can calculate a resultant force of all forces acting on the first force sensor 40.

On the other hand, the robot controller 14 calculates a force (hereinafter, referred to as "internal force") acting on the first force sensor 40 due to the mass of the robot 12, the mass of a member attached to the robot 12, the mass of the workpiece $W_1$ or the like gripped by the robot hand 24, and an inertial force caused by operation of the robot 12.

The internal force can be calculated by substituting the mass of each component of the robot 12, the posture of the robot 12, and the operating speed of each component of the robot 12 into the equation of motion. The robot controller 14 calculates an external force EF acting on a portion of the robot 12 (i.e., the robot base 18, the revolving drum 20, the upper arm 26, the forearm 28, the wrist 30, the robot hand 24, or the workpiece $W_1$ gripped by the robot hand 24) by subtracting the calculated internal force from the resultant force obtained from the first force sensor 40.

The external force EF is a sum of a handling force HF applied to the handling part 38 by the operator A and a contact force CF applied from an external object to the robot 12 when a portion of the robot 12 contacts the object.

Thus, in this embodiment, the first force sensor 40 and the robot controller 14 constitute an external force-detection part 46 configured to detect the external force EF applied to a portion of the robot 12.

The external force-detection part 46 can detect the external force EF applied to a portion of the robot 12 (i.e., the robot base 18, the revolving drum 20, the upper arm 26, the forearm 28, the wrist 30, the robot hand 24, or the workpiece $W_1$ gripped by the robot hand 24).

For example, an external force applied to the adapter 34 of the robot hand 24 is transmitted to the first force sensor 40 through the wrist 30, the robot arm 22, the revolving drum 20, and the robot base 18, and detected by the first force sensor 40.

Thus, in this embodiment, the external force-detection part 46 detects an external force applied to a portion of the robot 12 as a force acting between the fixing plate 16 and the robot base 18 due to the external force.

The second force sensor 42 is interposed between the handling part 38 and the adapter 34. The second force sensor 42 is composed of a 6-axis force sensor, and transmits to the robot controller 14 an output signal corresponding to a strain generated at the second force sensor 42.

The robot controller 14 filters the output signal from the second force sensor 42 by using a means, such as low-pass filtering, arithmetic averaging, weighted averaging, FIR filtering, or IIR filtering, so as to remove a noise component from the output signal.

Figure 4:
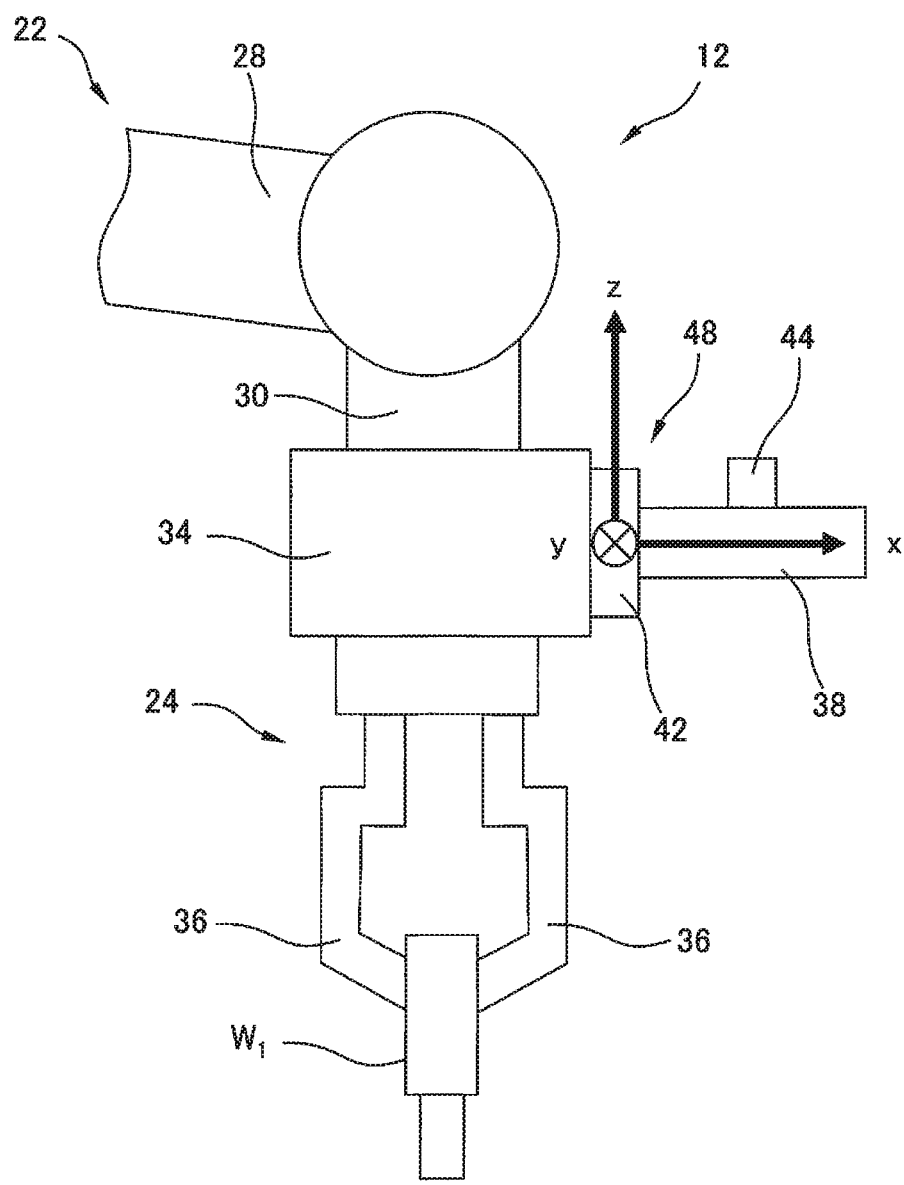
FIG. 4 is an enlarged view of the second force sensor shown in FIG. 1.

The robot controller 14 sets a second sensor-coordinate system for the second force sensor 42 as indicated by the Cartesian coordinate system in FIG. 4, for example. The position (origin position) and posture (x-axis, y-axis, and z-axis directions) of the second sensor-coordinate system change together with the position and posture of the robot hand 24.

Accordingly, the robot controller 14 updates the position and posture of the second sensor-coordinate system each time the robot controller 14 changes the position and posture of the robot hand 24.

The robot controller 14 respectively calculates forces in the x-axis direction, y-axis direction, and z-axis direction of the second sensor-coordinate system shown in FIG. 4, and moments about the x-axis direction, y-axis direction, z-axis direction of the second sensor-coordinate system, on the basis of the output signal from the second force sensor 42. In this manner, the robot controller 14 calculates the handling force HF applied to the handling part 38.

Thus, in this embodiment, the second force sensor 42 and the robot controller 14 constitute a handling force-detection part 48 configured to detect the handling force HF applied to the handling part 38.

Figure 5:
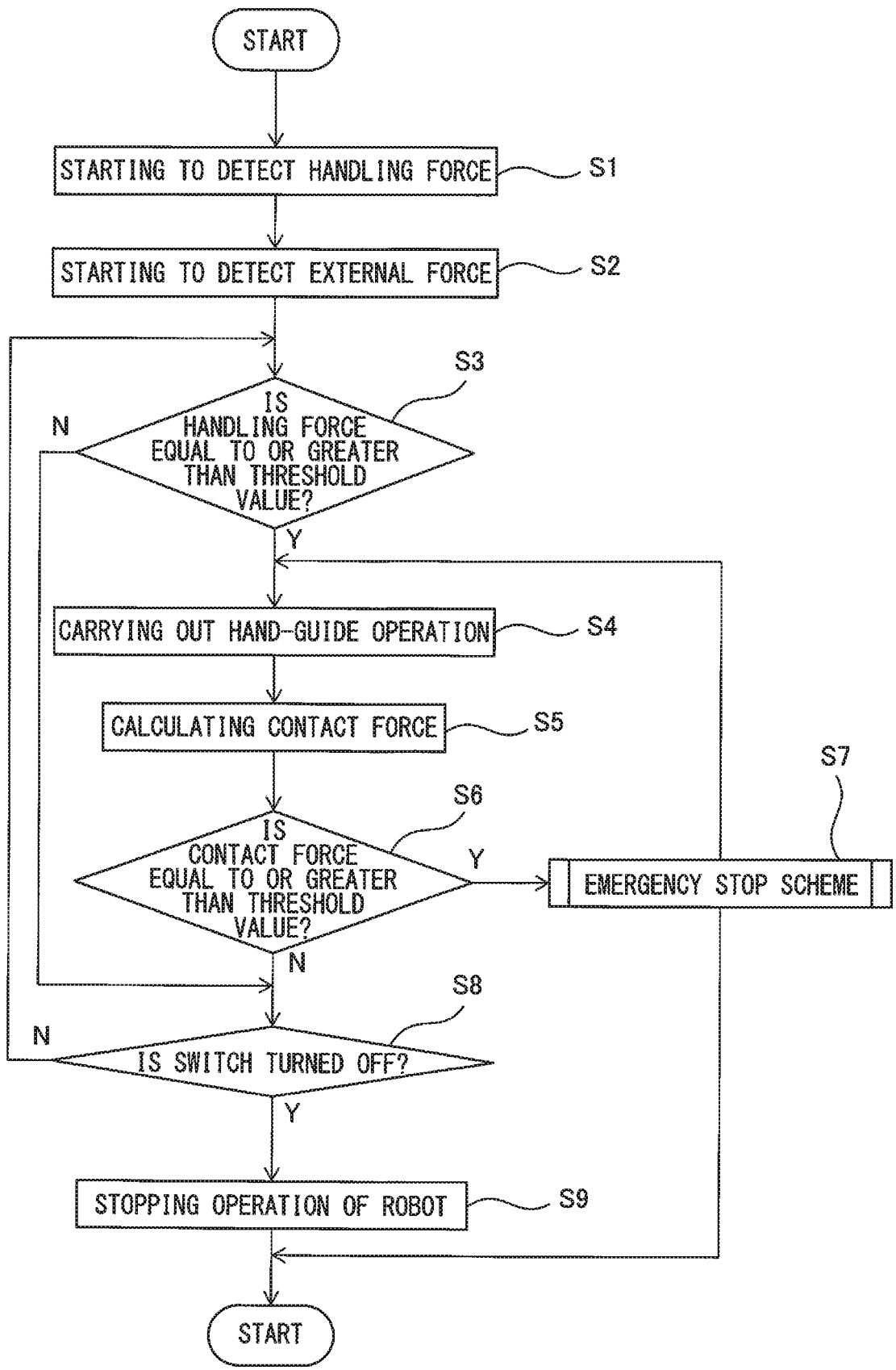
FIG. 5 is a flow chart illustrating an example of the operation flow of the robot system shown in FIG. 1.

Next, an example of an operation flow of the robot system 10 is described with reference to FIG. 5. The flow shown in FIG. 5 is started when the robot controller 14 receives the hand-guide ON signal from the switch 44.

At step S1, the robot controller 14 sends a command to the second force sensor 42 so as to start detection of the handling force HF applied to the handling part 38. Specifically, the robot controller 14 sends a detection-start command to the second force sensor 42.

When the second force sensor 42 receive the detection-start command from the robot controller 14, the second force sensor 42 transmits to the robot controller 14 an output signal corresponding to a strain generated in the second force sensor 42 at a cyclic period T (e.g., 0.5 sec).

The robot controller 14 calculates the handling force HF applied to the handling part 38 from the output signal sent from the second force sensor 42, and stores it in a storage built in the robot controller 14. In this manner, the handling force HF is detected at the cyclic period T.

At step S2, the robot controller 14 sends a command to the first force sensor 40 so as to start detection of the external force EF applied to the robot 12. Specifically, the robot controller 14 sends a detection-start command to the first force sensor 40.

When the first force sensor 40 receives the detection-start command from the robot controller 14, the first force sensor 40 transmits to the robot controller 14 an output signal corresponding to a strain generated in the first force sensor 40 at the cyclic period T. The robot controller 14 calculates the resultant force acting on the first force sensor 40 based on the output signal from the first force sensor 40.

On the other hand, the robot controller 14 calculates the internal force at this moment, in synchronism with the calculation of the resultant force. Then, the robot controller 14 calculates the external force EF acting on the robot 12 by subtracting the internal force from the resultant force, and stores it in the storage. In this manner, the external force EF is detected at the cyclic period T.

At step S3, the robot controller 14 determines whether or not the magnitude of the most-recently detected handling force HF is equal to or greater than a predetermined threshold value α ($|HF| \geq \alpha$). The threshold value α is predetermined for the handling force HF, and stored in the storage.

When the robot controller 14 determines that the magnitude of the handling force HF is equal to or greater than the threshold value α (i.e., determines YES), it proceeds to step S4. On the other hand, when the robot controller 14 determines that the magnitude of the handling force HF is smaller than the threshold value α (i.e., determines NO), it proceeds to step S8.

At step S4, the robot controller 14 carries out the hand-guide operation. Specifically, the robot controller 14 generates a speed command for moving the robot 12 in accordance with the forces in the x-axis, y-axis, and z-axis directions of the second sensor-coordinate system and the moments about the x-axis, y-axis, and z-axis of the second sensor-coordinate system, which constitute the most-recently detected handling force HF.

Then, the robot controller 14 sends the generated speed command to each servo motor 32 so as to move the robot hand 24 in the direction of the handling force HF applied by the operator A. Consequently, the robot 12 operates in accordance with the handling force HF applied to the handling part 38 by the operator A.

Thus, in this embodiment, the robot controller functions as an operation controller 50 (FIG. 2) configured to operate the robot 12 in accordance with the handling force HF.

At step S5, the robot controller 14 calculates the contact force CF applied to the robot 12. First, the robot controller 14 calculates a force HF' acting on the first force sensor 40 due to the handling force HF, from the most-recently detected handling force HF.

As an example, the robot controller 14 multiples the forces in the x-axis, y-axis, and z-axis directions of the second sensor-coordinate system, which constitute the most-recently detected handling force HF, with a coordinate conversion matrix for converting from the second sensor-coordinate system to the first sensor-coordinate system, so as to convert the forces of the second sensor-coordinate system to those of the first sensor-coordinate system. Thereby, it is possible to calculate the value in the first sensor-coordinate system of the force HF' acting on the first force sensor 40 due to the handling force HF.

Then, the robot controller 14 subtracts the thus-calculated force HF' from the most-recently detected external force EF. As a result, the component of the handling force HF is eliminated from the external force EF detected by the first force sensor 40, thereby it is possible to calculate the contact force CF applied from an external object to the robot 12 when a portion of the robot 12 contacts the object.

Thus, in this embodiment, the robot controller 14 functions as a contact force-calculation part 52 (FIG. 2) configured to calculate the contact force CF.

At step S6, the robot controller 14 determines whether or not the contact force CF calculated at step S5 is equal to or greater than a predetermined threshold value β (i.e., $CF \geq \beta$). The threshold value β is predetermined for the contact force CF and stored in the storage.

When the robot controller 14 determines that the contact force CF is equal to or greater than the threshold value β (i.e., determines YES), it proceeds to step S7. On the other hand, when the robot controller 14 determines that the contact force CF is smaller than the threshold value β (i.e., determines NO), it proceeds to step S8.

At step S7, the robot controller 14 carries out an emergency stop scheme. This step S7 will be described with reference to FIG. 6.

At step S11, the robot controller 14 stops operation of the robot 12. Specifically, the robot controller 14 functions as the operation controller 50, and sends a command to each servo motor 32 so as to stop the robot 12.

At step S12, the robot controller 14 generates a first alarm. As an example, the robot controller 14 generates an alarm signal indicating that "Robot interferes with external object", in the form of sound or character/image data. Then, the robot controller 14 outputs the alarm to the operator A via a speaker or display (not shown).

At step S13, the robot controller 14 determines an allowable motion direction of the robot 12. The allowable motion direction refers to a motion direction in which the contact force CF calculated at step S5 can be decreased when the robot 12 is moved in the allowable motion direction (i.e., the robot 12 or workpiece $W_1$ in contact with an external object moves away from the object).

As an example, the robot controller 14 sequentially stores in the storage a position command value for each movable component (the revolving drum 20, the upper arm 26, the forearm 28, and the wrist 30) of the robot 12 during execution of step S4.

Then, the robot controller 14 reads out from the storage the position command value $P_n$, which is stored immediately before (or after) a time point when it is determined YES at step S6, and a position command value $P_{n-1}$, which is stored immediately before the position command value $P_n$, and determines a motion direction in which each movable component of the robot 12 is moved from the position command value $P_n$ to the position command value $P_{n-1}$, as the allowable motion direction.

As another example, on the assumption that an external object contacts a specific portion (e.g., the robot hand 24) of the robot 12, the robot controller 14 calculates a direction $D_1$, in which the object contacts the specific portion, based on the contact force CF calculated at step S5 (or on the output signal of the first force sensor 40), and determines the direction $D_1$ to be the allowable motion direction.

At step S14, the robot controller 14 determines where or not the magnitude of the most-recently detected handling force HF is equal to or greater than the threshold value α (i.e., $|HF| \geq \alpha$). Specifically, the handling force-detection part 48 detects the handling force HF at the cyclic period T continuously, after completion of step S11.

When the robot controller 14 determines that the magnitude of the most-recently detected handling force HF is equal to or greater than the threshold value α, after completion of step S11 (i.e., determines YES), the robot controller 14 proceeds to step S15. On the other hand, when the robot controller 14 determines that the magnitude of the most-recently detected handling force HF is smaller than the threshold value α (i.e., determines NO), the robot controller 14 proceeds to step S17.

At step S15, the robot controller 14 determines whether or not the direction of the handling force HF, which is determined to be equal to or greater than the threshold value α at step S14, coincides with the allowable motion direction determined at step S13.

For example, if the direction of the handling force HF is within a range of ±5° of the allowable motion direction determined at step S13, the robot controller 14 determines that the direction of the handling force HF coincides with the allowable motion direction.

When the robot controller 14 determines that the direction of the handling force HF coincides with the allowable motion direction (i.e., determines YES), the robot controller 14 proceeds to step S4 in FIG. 5, and carries out the hand-guide operation again in accordance with the handling force HF. On the other hand, when the robot controller 14 determines that the direction of the handling force HF does not coincide with the allowable motion direction (i.e., determines NO), the robot controller 14 proceeds to step S16.

At step S16, the robot controller 14 generates a second alarm. As an example, the robot controller 14 generates an alarm signal indicating that "Movement in this direction cannot be allowed" in the form of sound or character/image data. Then, the robot controller 14 outputs the alarm to the operator A through the speaker or the display.

At step S17, the robot controller 14 determines whether or not the switch 44 is turned off. Specifically, the robot controller 14 determines whether or not the hand-guide ON signal from the switch 44 is null.

Figure 6:
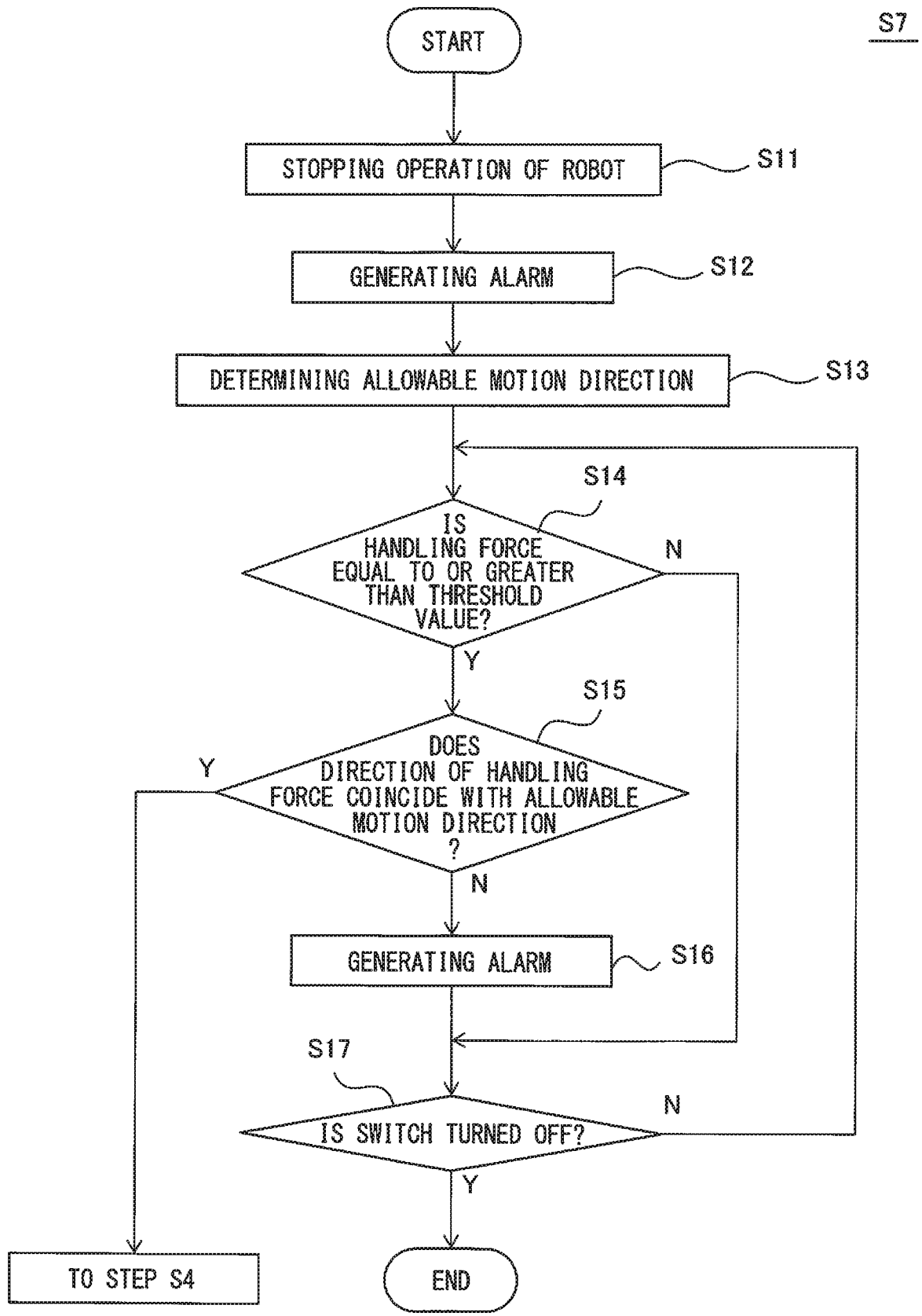
FIG. 6 is a flow chart illustrating an example of the flow of step S7 shown in FIG. 5.

When the robot controller 14 determines that the switch 44 is turned off (i.e., determines YES), the robot controller 14 ends step S7 shown in FIG. 6, and thereby ends the flow shown in FIG. 5. On the other hand, when the robot controller 14 determines that the switch 44 is turned on (i.e., determines NO), it returns to step S14.

Referring again to FIG. 5, at step S8, the robot controller 14 determines whether or not the switch 44 is turned off, similarly as the above-mentioned step S17. When the robot controller 14 determines that the switch 44 is turned off (i.e., determines YES), it proceeds to step S9. On the other hand, when the robot controller 14 determines that the switch 44 is turned on (i.e., determines NO), it returns to step S3.

At step S9, the robot controller 14 stops the operation of the robot 12, similarly as the above-mentioned step S11. Then, the robot controller 14 ends the flow shown in FIG. 5.

As described above, in this embodiment, during execution of the hand-guide operation at step S4, the robot controller 14 eliminates the component of the handling force HF applied by the operator A from the external force EF detected by the external force-detection part 46 so as to calculate the contact force CF due to the contact between the robot 12 (or the workpiece $W_1$) and an external object.

According to this configuration, since the contact force CF can be monitored in real-time during execution of the hand-guide operation, it is possible to reliably detect the contact between the robot 12 (or the workpiece $W_1$) and the external object.

Further, in this embodiment, when it is determined YES at step S6, the robot controller 14 stops the operation of the robot 12 (step S11). According to this configuration, when the robot 12 or the workpiece $W_1$ contacts an external object during execution of the hand-guide operation, it is possible to prevent an excessive force from being applied to the robot 12 or the workpiece $W_1$, while securing safety of the operator A.

Further, in this embodiment, the robot controller 14 restarts the hand-guide operation of step S4 only when the direction of the handling force HF coincides with the allowable motion direction, after the operation of the robot 12 is stopped.

According to this configuration, it is possible to reliably prevent the robot 12 (or the workpiece $W_1$) from being operated to be pressed against the external object by a stronger force due to the hand-guide operation by the operator A, when the robot 12 (or the workpiece $W_1$) contacts an external object.

Further, in this embodiment, when the operation of the robot 12 is stopped, the robot controller 14 outputs the first alarm indicative of it (step S12). According to this configuration, the operator A can intuitively recognize that the robot 12 (or the workpiece $W_1$) contacts the external object.

Further, when the robot controller 14 detects that the handling force HF is applied in a direction different from the allowable motion direction after the stop of the robot 12 (i.e., when it is determined NO at step S15), it outputs the second alarm indicative of it.

According to this configuration, the operator A can intuitively recognize that he/she is about to operate the robot 12 so that the robot 12 (or the workpiece $W_1$) is further pressed against the external object.

Further, in this embodiment, the output signals from the first force sensor 40 and the second force sensor 42 are filtered so as to eliminate noise components therefrom. According to this configuration, the external force EF and the handling force HF can be reliably detected without being influenced by instantaneous changes in the output signals from the first force sensor 40 and the second force sensor 42, and therefore, it is possible to improve the detection accuracy of the contact force CF.

Figure 7:
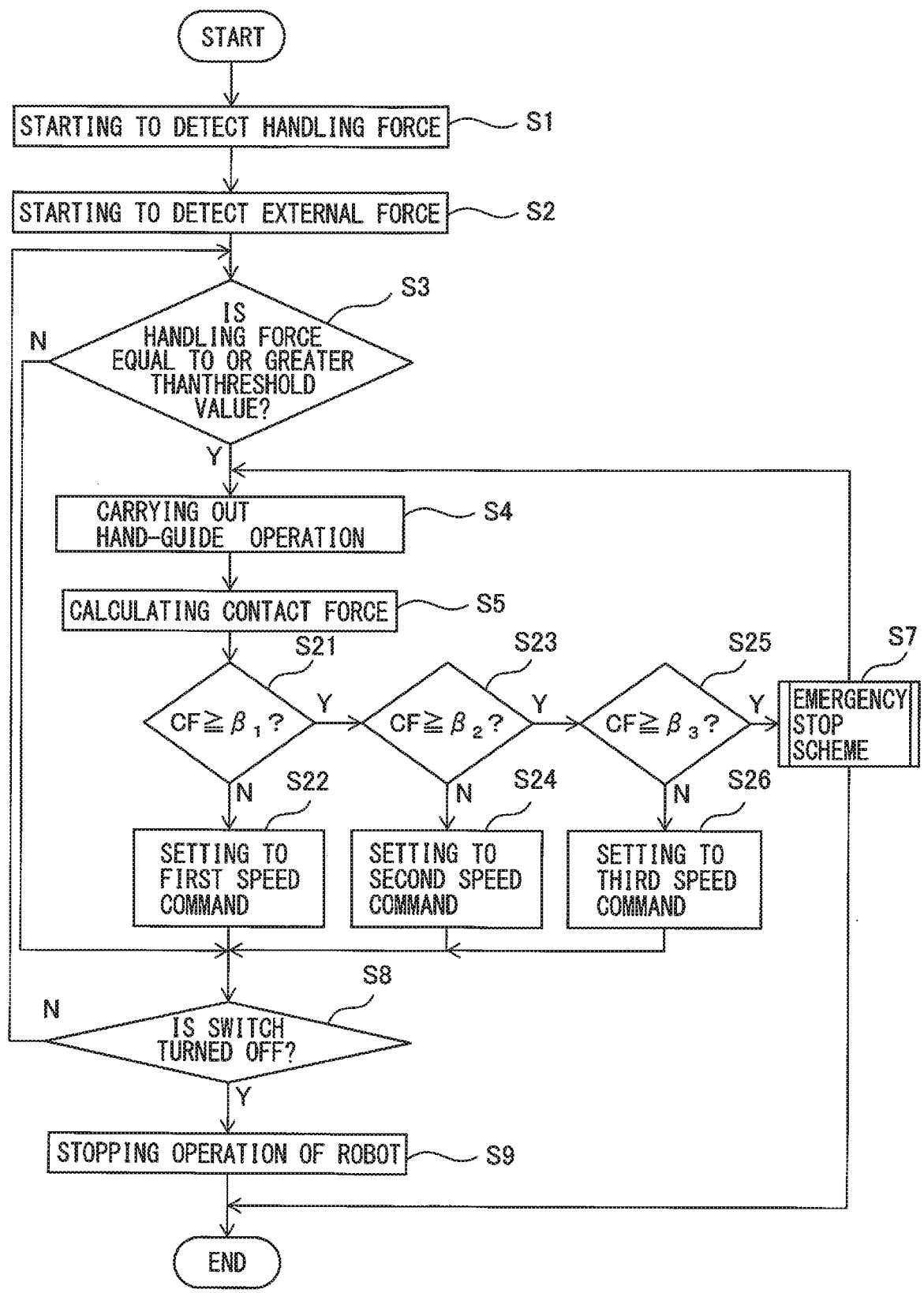
FIG. 7 is a flow chart illustrating another example of the operation flow of the robot system shown in FIG. 1.

Next, referring to FIG. 7, another example of the operation flow of the robot system 10 will be described. Note that, in the flow shown in FIG. 7, processes similar to those in the flow shown in FIG. 5 are assigned the same step numbers, and detailed descriptions thereof will be omitted.

At the start of the operation flow according to this embodiment, the speed command, which is to be transmitted to each servo motor 32 when the hand-guide operation is carried out at step S4, is set to be a first speed command $V_1$ as initial setting. The first speed command $V_1$ is for operating the robot 12 at a first speed.

After step S5, at step S21, the robot controller 14 determines whether or not the contact force CF calculated at step S5 is equal to or greater than a predetermined threshold value $\beta_1$. The threshold value $\beta_1$ is predetermined for the contact force CF, and stored in the storage.

When the robot controller 14 determines that the contact force CF is equal to or greater than the threshold value $\beta_1$ (i.e., determines YES), it proceeds to step S23. On the other hand, when the robot controller 14 determines that the contact force CF is smaller than the threshold value $\beta_1$ (i.e., determines NO), it proceeds to step S22.

At step S22, the robot controller 14 sets the speed command, which is to be transmitted to each servo motor 32 when the hand-guide operation is carried out, to the first speed command $V_1$. If the speed command is already set to the first speed command $V_1$ at the start of step S22, the robot controller 14 maintains the setting of the speed command to the first speed command $V_1$.

At step S23, the robot controller 14 determines where or not the contact force CF calculated at step S5 is equal to or greater than a predetermined threshold value $\beta_2$. The threshold value $\beta_2$ is predetermined as a value greater than the above-mentioned threshold value $\beta_1$ (i.e., $\beta_2 > \beta_1$), and stored in the storage.

When the robot controller 14 determines that the contact force CF is equal to or greater than the threshold value $\beta_2$ (i.e., determines YES), it proceeds to step S25. On the other hand, when the robot controller 14 determines that the contact force CF is smaller than the threshold value $\beta_2$ (i.e., determines NO), it proceeds to step S24.

At step S24, the robot controller 14 sets the speed command, which is to be transmitted to each servo motor 32 when the hand-guide operation is carried out, to a second speed command $V_2$. The second speed command $V_2$ is for operating the robot 12 at a second speed lower than the first speed.

At step S25, the robot controller 14 determines whether or not the contact force CF calculated at step S5 is equal to or greater than a predetermined threshold value $\beta_3$. The threshold value $\beta_3$ is predetermined as a value greater than the above-mentioned threshold value $\beta_2$ (i.e., $\beta_3 > \beta_2$), and stored in the storage.

When the robot controller 14 determines that the contact force CF is equal to or greater than the threshold value $\beta_3$ (i.e., determines YES), it proceeds to step S7. On the other hand, when the robot controller 14 determines that the contact force CF is smaller than the threshold value $\beta_3$ (i.e., determines NO), it proceeds to step S26.

At step S26, the robot controller 14 sets the speed command, which is to be transmitted to each servo motor 32 when the hand-guide operation is carried out, to a third speed command $V_3$. The third speed command $V_3$ is for operating the robot 12 at a third speed lower than the second speed.

Thus, in this embodiment, the robot controller 14 changes the operation speed of the robot 12 in response to the contact force CF calculated at step S5. Specifically, the robot controller 14 changes the setting of the speed command so that the greater the calculated contact force CF is, the slower the operation speed of the robot 12 is.

According to this configuration, if the contact force CF is relatively small, by decreasing the operation speed of the robot 12 without stopping the operation thereof, it is possible to decrease a possibility that an excessive force is applied due to the contact between the robot 12 (or the workpiece $W_1$) or the operator A and an external object. Accordingly, it is possible to secure safety of the robot 12 (or the workpiece $W_1$) or the operator A, while preventing the work efficiency from decreasing.

Figure 8:
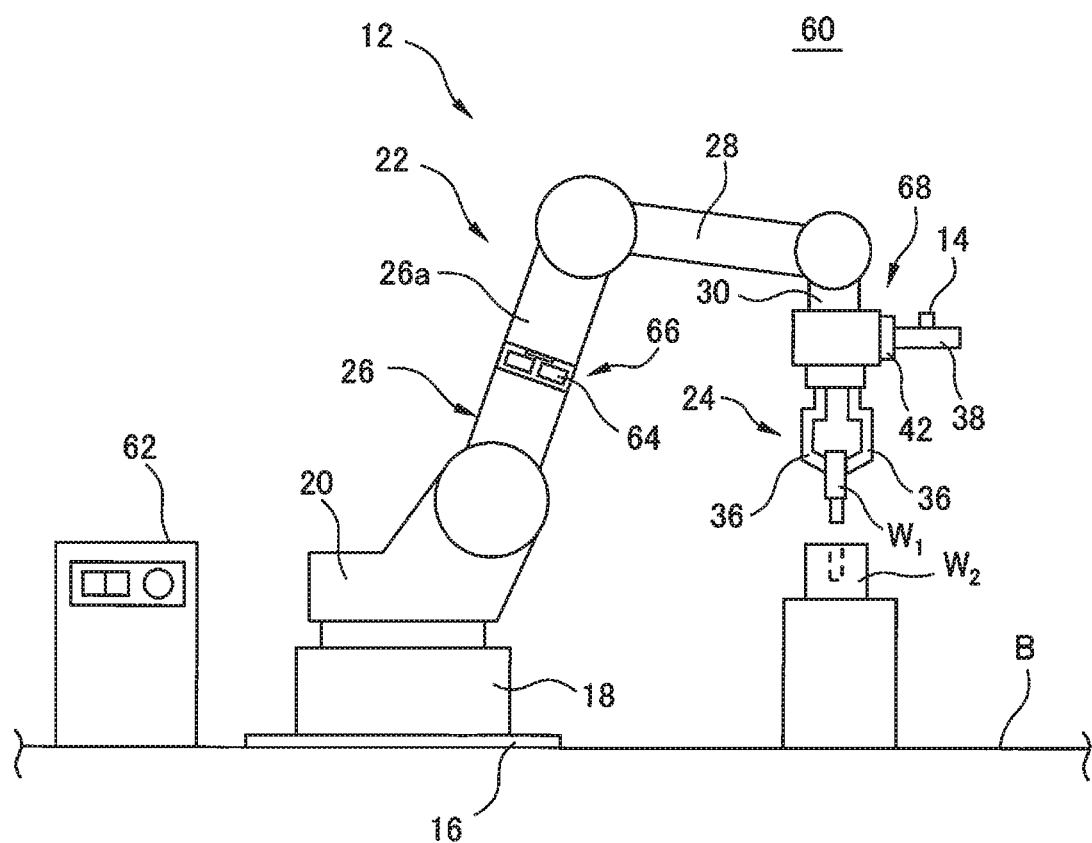
FIG. 8 is a schematic view of a robot system according to another embodiment.
Figure 9:
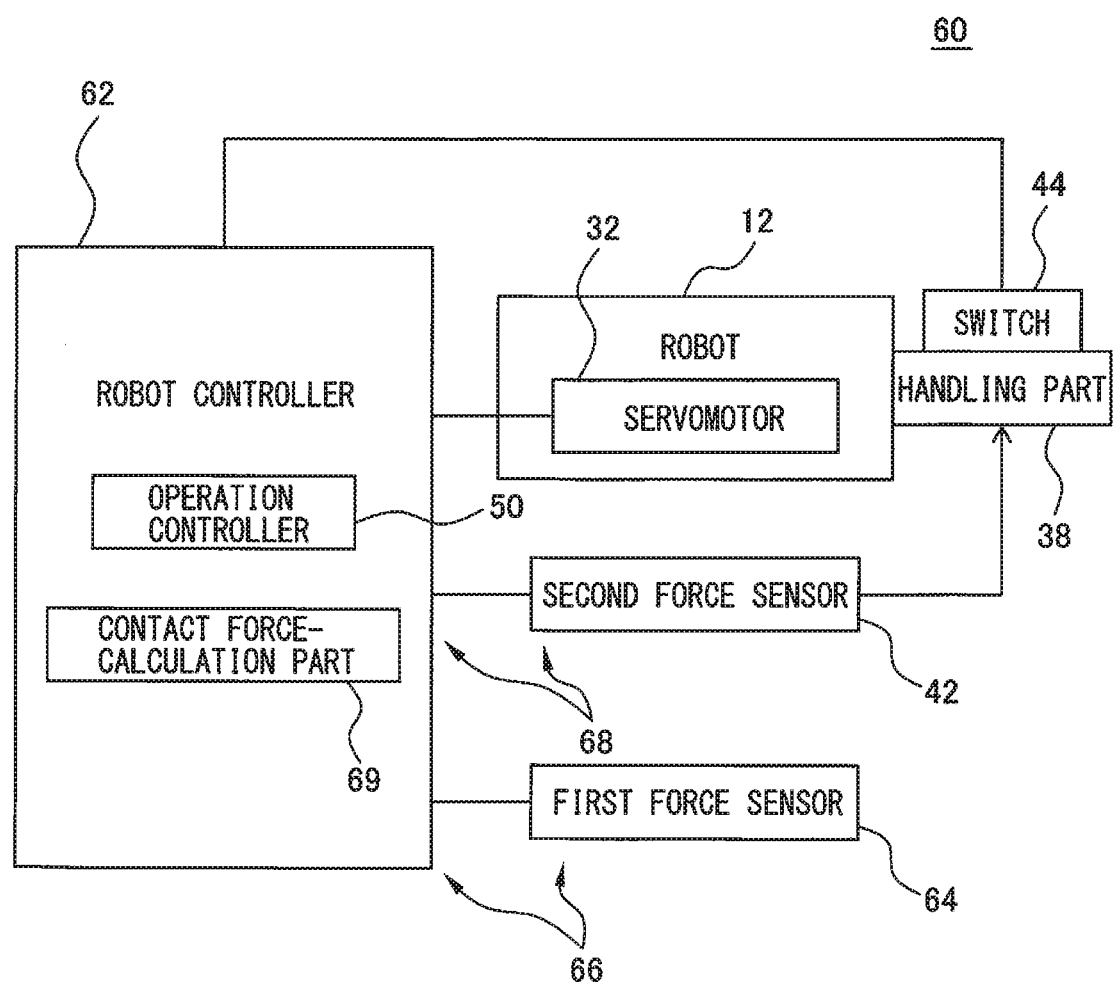
FIG. 9 is a block diagram of the robot system shown in FIG. 8.

Next, referring to FIGS. 8 and 9, a robot system 60 according to another embodiment will be described. Note that, in various embodiments described hereinafter, elements similar to those of the already-mentioned embodiment are assigned the same reference numerals, and detailed descriptions thereof will be omitted.

The robot system 60 includes a robot 12, a robot controller 62, a first force sensor 64, and a second force sensor 42. The robot controller 62 includes e.g. a CPU and a storage (both not shown), and controls each component of the robot 12 directly or indirectly.

The first force sensor 64 is composed of a 6-axis force sensor including a plurality of strain gauges, similar as the above-described first force sensor 40, and transmits to the robot controller 62 an output signal corresponding to a strain generated in the first force sensor 64. The first force sensor 64 is incorporated in an upper arm 26.

Figure 10:
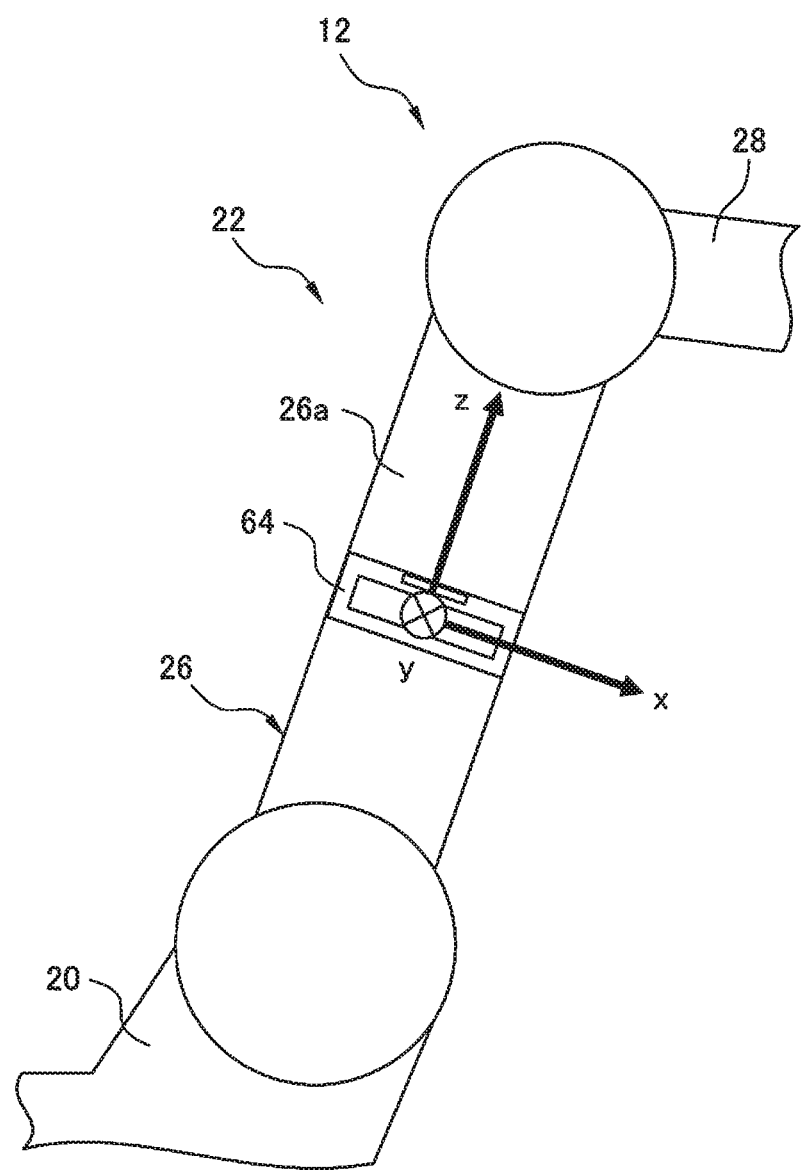
FIG. 10 is an enlarged view of a first force sensor shown in FIG. 8.

For example, the robot controller 62 sets a first sensor-coordinate system for the first force sensor 64 as indicated in an orthogonal coordinate system in FIG. 10. The robot controller 62 respectively calculates forces in the x-axis, y-axis, and z-axis directions of the first sensor-coordinate system shown in FIG. 10, and moments about the x-axis, y-axis, and z-axis, based on the output signal from the first force sensor 64. In this manner, the robot controller 62 can calculate a resultant force of all the forces acting on the first force sensor 64.

On the other hand, the robot controller 62 calculates an internal force that acts on the first force sensor 64 due to the masses of the components located at the distal end side of the first force sensor 64 (i.e., a distal end part 26a of the upper arm 26, a forearm 28, a wrist 30, and a robot hand 24 (referred to as "distal end side components")) of the components of the robot 12, the mass of the workpiece $W_1$ or the like gripped by the robot hand 24, and an inertial force caused by operation of the robot 12.

The internal force can be calculated by substituting the mass of the distal end side components of the robot 12, the posture of the robot 12, and the operating speed of each component of the robot 12 into the known equation of motion.

Then, the robot controller 62 calculates an external force EF acting on the distal end side components of the robot 12 by subtracting the calculated internal force from the resultant force obtained from the first force sensor 64. The external force EF is a sum of a handling force HF applied to a handling part 38 by the operator A and a contact force CF applied from an external object to the distal end side components when the distal end side components of the robot 12 contacts the object.

Thus, in this embodiment, the first force sensor 64 and the robot controller 62 constitute an external force-detection part 66 configured to detect the external force EF acting on the distal end side components of the robot 12.

The external force-detection part 66 detects the external force applied to a portion of the distal end side components (e.g., the part 26a of the upper arm 26, the forearm 28, the wrist 30, or the robot hand 24) as force acting on the first force sensor 64 due to the external force.

On the other hand, the second force sensor 42 and the robot controller 62 constitute a handling force-detection part 68 configured to detect the handling force HF applied to the handling part 38.

Next, referring to FIGS. 5 to 7, an operation flow of the robot system 60 will be described. The robot controller 62 carries out the operation flow shown in FIG. 5 or 7. The operation of the robot system 60 is different from that of the above-described robot system 10 in steps S2 and S5.

Specifically, at step S2, the robot controller 62 sends a command to the first force sensor 64 so as to start detection of the external force EF acting on the distal end side components of the robot 12. Specifically, the robot controller 62 sends a detection starting command to the first force sensor 64.

When receiving the detection starting command from the robot controller 62, the first force sensor 64 sends to the robot controller 62 an output signal corresponding to a strain generated in the first force sensor 64 at a cyclic period T. The robot controller 62 calculates the resultant force acting on the first force sensor 64 from the output signal from the first force sensor 64.

On the other hand, the robot controller 62 calculates the internal force at this moment, in synchronism with the calculation of the resultant force. Then, the robot controller 62 calculates the external force EF acting on the distal end components of the robot 12 by subtracting the internal force from the resultant force, and stores it in the storage.

At step S5, the robot controller 62 calculates the contact force CF acting on the distal end side components of the robot 12. First, the robot controller 62 calculates a force HF', which acts on the first force sensor 64 due to the handling force HF, from the most-recently detected handling force HF.

For example, the robot controller 62 multiplies the forces in the x-axis, y-axis, and z-axis directions of the second sensor-coordinate system, which constitute the most-recently detected handling force HF, with a coordinate conversion matrix from the second sensor-coordinate system to the first sensor-coordinate system, so as to convert into a force in the first sensor-coordinate system. Thereby, it is possible to calculate the force value in the first sensor-coordinate system of the force HF' acting on the first force sensor 64 due to the handling force HF.

Subsequently, the robot controller 62 subtracts the force HF' calculated as described above from the most-recently detected external force EF. Thereby, the component of the handling force HF is eliminated from the external force EF detected by the first force sensor 64, as a result of which, it is possible to calculate the contact force CF applied from an external object to the distal end side components of the robot 12 when the distal end side components of the robot 12 contacts the object.

Thus, in this embodiment, the robot controller 62 has a function as a contact force-calculation part 69 (FIG. 9) that calculates the contact force CF acting on the distal end side component.

According to this embodiment, during the execution of the hand-guide operation, the contact force CF due to contact between the distal end side components of the robot 12 and an external object can be monitored in real time, and therefore, it is possible to reliably detect the contact between the distal end side components of the robot 12 and the external object.

Figure 11:
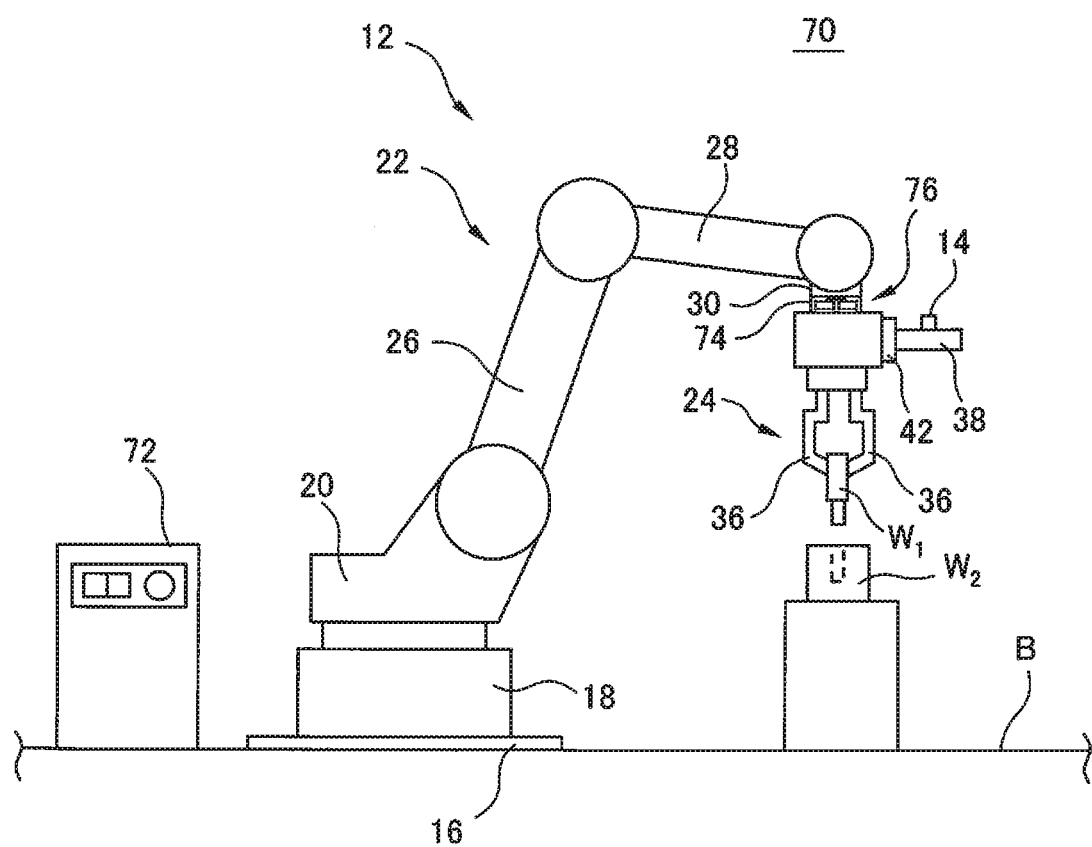
FIG. 11 is a schematic view of a robot system according to still another embodiment.

Next, referring to FIG. 11, a robot system 70 according to still another embodiment will be described. The robot system 70 is different from the above-described robot system 60 in the following features. Specifically, in the robot system 70, a first force sensor 74 is attached to the wrist 30. In this embodiment, the robot controller 72 and the first force sensor 74 constitute an external force-detection part 76 configured to detect an external force EF applied to the robot hand 24.

Note that, in the above-described embodiments, the first force sensors 40, 64, and 74 are composed of a 6-axis force sensor. However, the first force sensors are not limited thereto but may be comprised of a torque sensor.

Figure 12:
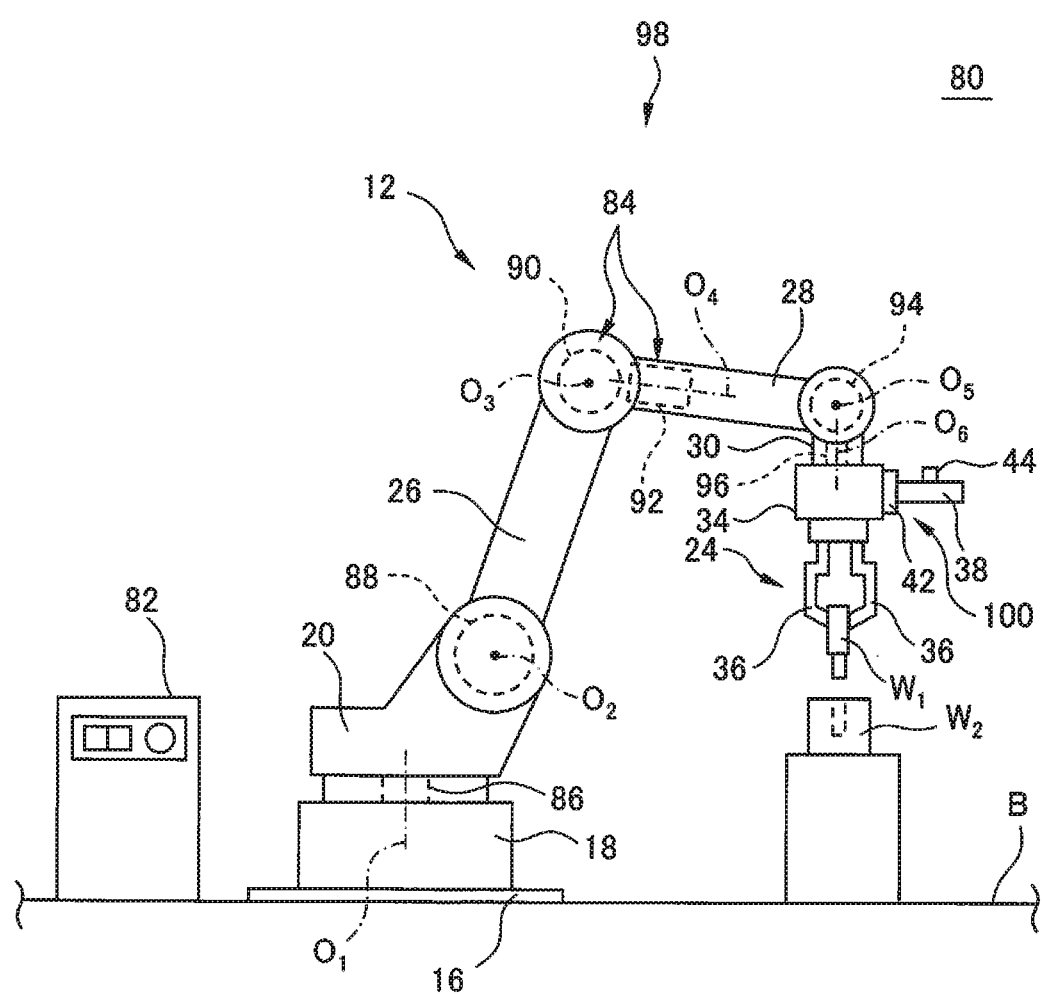
FIG. 12 is a schematic view of a robot system according to a still another embodiment.
Figure 13:
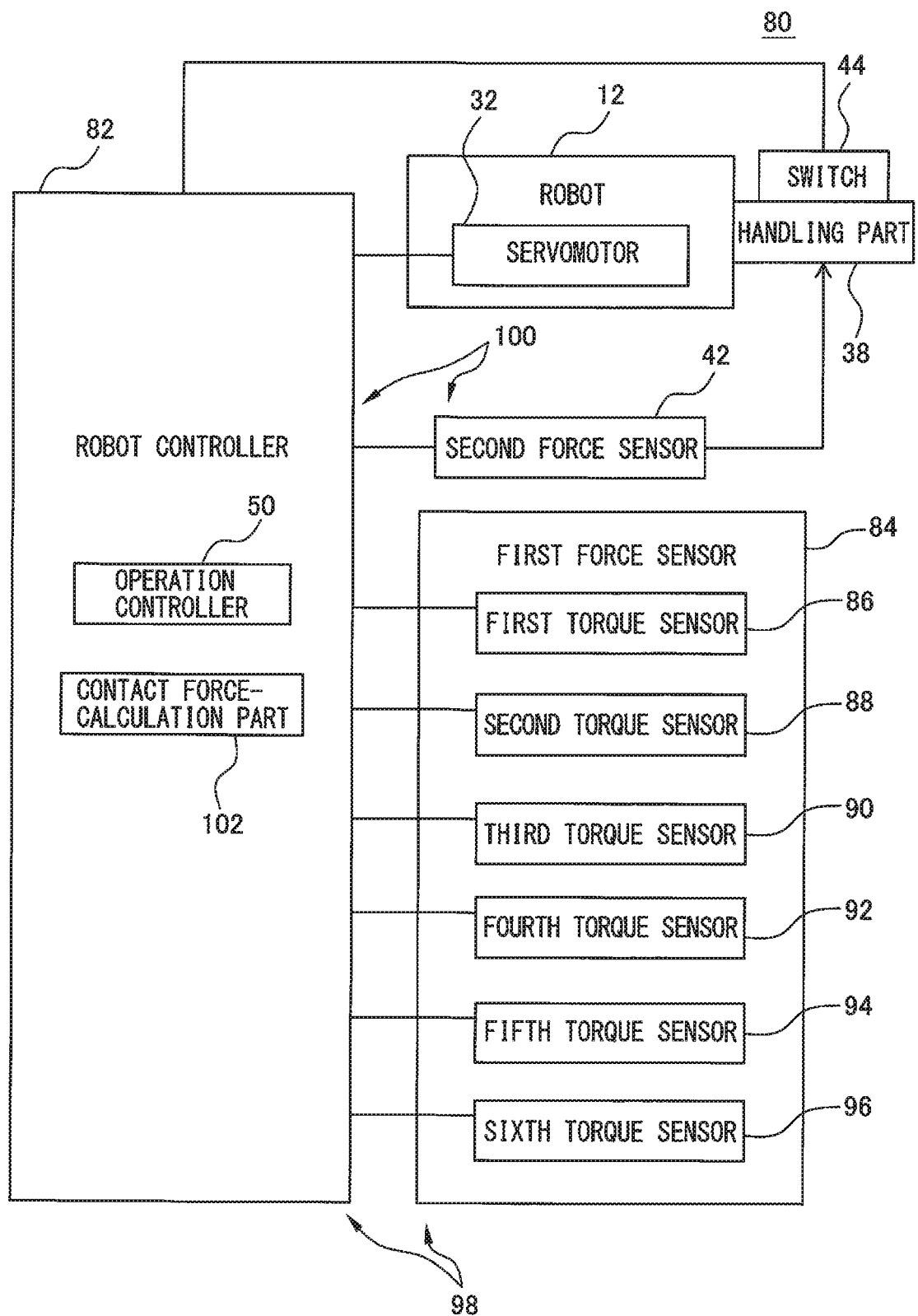
FIG. 13 is a block diagram of the robot system shown in FIG. 12.

Hereinafter, referring to FIGS. 12 and 13, a robot system 80 according to such an embodiment will be described. The robot system 80 includes the robot 12, a robot controller 82, a first force sensor 84, and the second force sensor 42. The robot controller 82 includes e.g. a CPU and a storage (both not shown), and controls each component of the robot 12 directly or indirectly.

The first force sensor 84 includes a first torque sensor 86, a second torque sensor 88, a third torque sensor 90, a fourth torque sensor 92, a fifth torque sensor 94, and a sixth torque sensor 96.

The first torque sensor 86 is built in the servo motor 32 for rotating the revolving drum 20 about a first axis $O_1$, and detects a torque $\tau_1$ about the first axis $O_1$ to transmit it to the robot controller 82. The first axis $O_1$ is parallel to the vertical direction.

The second torque sensor 88 is built in the servo motor 32 for rotating the upper arm 26 about a second axis $O_2$, and detects a torque $\tau_2$ about the second axis $O_2$ to transmit it to the robot controller 82.

The third torque sensor 90 is built in the servo motor 32 for rotating the forearm 28 about a third axis $O_3$, and detects a torque $\tau_3$ about the third axis $O_3$ to transmit it to the robot controller 82.

The fourth torque sensor 92 is built in the servo motor 32 for rotating the forearm 28 about a fourth axis $O_4$, and detects a torque $\tau_4$ about the fourth axis $O_4$ to transmit it to the robot controller 82.

The fifth torque sensor 94 is built in the servo motor 32 for rotating the wrist 30 about a fifth axis $O_5$, and detects a torque $\tau_5$ about the fifth axis $O_5$ to transmit it to the robot controller 82.

The sixth torque sensor 96 is built in the servo motor 32 for rotating the wrist 30 about a sixth axis $O_6$, and detects a torque $\tau_6$ about the sixth axis $O_6$ to transmit it to the robot controller 82.

The robot controller 82 respectively calculates torques (i.e., "internal forces") $I\tau_1$, $I\tau_2$, $I\tau_3$, $I\tau_4$, $I\tau_5$, and $I\tau_6$ acting about the first to sixth axes $O_1$, $O_2$, $O_3$, $O_4$, $O_5$, and $O_6$ due to the mass of each component of the robot 12, the mass of the workpiece $W_1$ or the like gripped by the robot hand 24, and an inertial force generated by operation of each component of the robot 12.

These internal forces $I\tau_1$, $I\tau_2$, $I\tau_3$, $I\tau_4$, $I\tau_5$, and $I\tau_6$ can be calculated by substituting the mass of each component of the robot 12, the posture of the robot 12, and the operating speed of each component of the robot 12 in the known equation of motion.

The robot controller 82 subtracting the calculated internal forces $I\tau_1$, $I\tau_2$, $I\tau_3$, $I\tau_4$, $I\tau_5$, and $I\tau_6$ from the torques $\tau_1$, $\tau_2$, $\tau_3$, $\tau_4$, $\tau_5$, and $\tau_6$ acquired from the first to sixth torque sensors 86, 88, 90, 92, 94, and 96, respectively, thereby calculates torques (hereinafter, referred to as "external force torques") $E\tau_1$, $E\tau_2$, $E\tau_3$, $E\tau_4$, $E\tau_5$, and $E\tau_6$ acting about the first to sixth axes $O_1$, $O_2$, $O_3$, $O_4$, $O_5$, and $O_6$ due to external forces applied to the robot 12.

The robot controller 82 calculates an external force EF acting on the robot hand 24 based on the external force torques $E\tau_1$, $E\tau_2$, $E\tau_3$, $E\tau_4$, $E\tau_5$, and $E\tau_6$. The external force EF is a sum of the handling force HF applied to the handling part 38 by the operator A and the contact force CF applied from an external object to the robot hand 24 when the robot hand 24 contacts the object.

Thus, in this embodiment, the first force sensor 84 and the robot controller 82 constitute an external force-detection part 98 configured to detect the external force EF applied to the robot hand 24. On the other hand, the second force sensor 42 and the robot controller 82 constitute a handling force-detection part 100 configured to detect the handling force HF applied to the handling part 38.

Next, referring to FIGS. 5 to 7, the operation flow of the robot system 80 will be described. The robot controller 82 carries out the operation flow shown in FIG. 5 or 7. The operation of the robot system 80 is different from that of the above-described robot system 10 in steps S2 and S5.

Specifically, at step S2, the robot controller 82 sends a command to the first force sensor 84 so as to start detection of the external force EF applied to the robot hand 24. Specifically, the robot controller 82 sends detection-start commands to the first to sixth torque sensors 86, 88, 90, 92, 94, and 96.

When receiving the detection-start commands from the robot controller 82, the first to sixth torque sensors 86, 88, 90, 92, 94, and 96 respectively detect the torques $\tau_1$, $\tau_2$, $\tau_3$, $\tau_4$, $\tau_5$, and $\tau_6$ at the cyclic period T, and transmit them to the robot controller 82.

The robot controller 82 respectively calculates the internal forces $I\tau_1$, $I\tau_2$, $I\tau_3$, $I\tau_4$, $I\tau_5$, and $I\tau_6$ at this moment, in synchronism with the acquisition of the torques $\tau_1$, $\tau_2$, $\tau_3$, $\tau_4$, $\tau_5$, and $\tau_6$.

Then, the robot controller 82 subtracts the internal forces $I\tau_1$, $I\tau_2$, $I\tau_3$, $I\tau_4$, $I\tau_5$, and $I\tau_6$ from the torques $\tau_1$, $\tau_2$, $\tau_3$, $\tau_4$, $\tau_5$, and $\tau_6$ respectively, so as to calculate the external force torques $E\tau_1$, $E\tau_2$, $E\tau_3$, $E\tau_4$, $E\tau_5$. Then, the robot controller 82 calculates the external force EF acting on the robot hand 24 from the external force torques $E\tau_1$, $E\tau_2$, $E\tau_3$, $E\tau_4$, $E\tau_5$, and stores it in the storage.

At step S5, the robot controller 82 calculates the contact force CF acting on the robot hand 24. Specifically, the robot controller 82 subtracts the most-recently detected handling force HF from the most-recently detected external force EF. As a result, the handling force HF is eliminated from the external force EF detected by the first force sensor 84, thereby, it is possible to calculate the contact force CF applied from an external object to the robot hand 24 when the robot hand 24 contacts the object.

Thus, in this embodiment, the robot controller 82 functions as a contact force-calculation part 102 (FIG. 13) configured to calculate the contact force CF acting on the robot hand 24.

According to this embodiment, during the execution of the hand-guide operation, the contact force CF due to contact between the robot hand 24 (or the workpiece $W_1$) and an external object can be monitored in real time, and therefore, it is possible to reliably detect the contact between the robot hand 24 (or the workpiece $W_1$) and the external object.

Note that, in the above-described embodiments, the robot 12 is a vertical articulated robot. However, the robot 12 may be a robot of any type, e.g., SCARA type or parallel-link type.

Further, in the operation flow shown in FIG. 6 of the above-mentioned embodiments, the robot 12 is stopped at step S11. However, the robot controller 14, 62, 72, or 82 may merely output an alarm to the operator A at step S12 without carrying out step S11.

Further, the robot controllers 14, 62, 72, and 82 may display the contact force CF calculated at step S5 on a display in real time. In this case, the robot controller 14, 62, 72, or 82 may merely display the calculated contact force CF on the display to inform the operator A of it, without carrying out step S11 shown in FIG. 6.

Further, in the above-described embodiments, each of the force sensors 40, 42, 64, and 74 is comprised of a 6-axis force sensor including strain gauges. However, the force sensor 40, 42, 64, or 74 may be a sensor configured to detect a force based on a change in electrostatic capacitance, or a sensor configured to optically detect a strain.

Further, the filtering method used in the robot system 10 in order to eliminate noise components from the output signal of the first force sensor 40 and the second force sensor 42 is also applicable to the robot system 60, 70, or 80.

While, in the foregoing, the invention has been described through embodiments thereof, the embodiments described above are not intended to limit the invention defined in the appended claims. Further, any form of combination of the features described in the embodiments of the invention can be encompassed in the technical scope of the invention, but all combinations of such features are not necessarily essential to the solving means of the invention. In addition, it is apparent to those skilled in the art that various changes and improvements can made to the above-described embodiments.

Further, it should be noted that the execution order of each processing such as operation, procedure, step, and stage in the apparatus, system, program, and method set forth in the claims, specification, and drawings is not particularly specified using terms such as "before", "prior to" or the like, and that each processing above can be performed in any order unless the output of the previous processing being used at the following processing thereof. Even though the operation flows in the claims, specification, and drawings have been described, for convenience, using terms such as "first", "next", "subsequently", "then" or the like, this does not mean that it is essential to perform in this order.

The invention claimed is:

1. A human-cooperative robot system configured to work in cooperation with an operator, the system comprising:
    a robot including a handle; and
    a processor configured to:
        calculate a handling force applied to the handle, based on an output signal from a first force sensor provided at the handle,
        operate the robot in accordance with the calculated handling force,
    when operating the robot, calculate
        a resultant force of all forces acting on, a second force sensor provided at a proximal end side component of the robot, based on an output signal from the second force sensor, and
        an internal force acting on the second force sensor, based on mass of the robot,
    calculate an external force applied to the robot when operating the robot, by subtracting the calculated internal force from the calculated resultant force, the external force being indicative of a sum of
        (1) the handling force, and
        (2) a contact force applied from an external object to the robot when the robot contacts the object, and
    calculate the contact force by subtracting the calculated handling force from the calculated external force.

2. The robot system according to claim 1, wherein the processor is further configured to carry out filtering to remove a noise component from the output signal of the first force sensor or the second force sensor.

3. The robot system according to claim 1, wherein the processor is further configured to stop an operation of the robot when the calculated contact force exceeds a predetermined threshold value.

4. The robot system according to claim 3, wherein the processor is configured to further operate the robot in accordance with the handling force only when a direction of the handling force calculated after the operation of the robot is stopped is a direction in which the contact force can be reduced.

5. The robot system according to claim 1, wherein the processor is further configured to change an operating speed of the robot in response to the calculated contact force.

6. The robot system according to claim 1, wherein the processor is further configured to:
    calculate a component of the handling force, which acts on the second force sensor due to the handling force, based on the output signal from the first force sensor; and
    calculate the contact force by subtracting the calculated component of the handling force from the calculated external force.

7. The robot system according to claim 4, wherein the processor is further configured to output a first alarm upon stopping the operation of the robot, and a second alarm upon determining that the direction of the handling force does not coincide with an allowable motion direction.

\* \* \* \* \*